United States Patent [19]

Whiteside et al.

[11] Patent Number: 4,502,588
[45] Date of Patent: Mar. 5, 1985

[54] APPARATUS AND METHODS FOR TRANSFERRING NESTED STACKS OF PLASTIC ARTICLES FROM AN ELEVATED CHUTE TO AN UNDERLYING CONVEYOR SURFACE

[75] Inventors: Robert C. Whiteside, Harrison; Fred L. Greynolds, Beaverton; Albert W. Arends, Gladwin, all of Mich.

[73] Assignee: Leesona Corporation, Beaverton, Mich.

[21] Appl. No.: 503,716

[22] Filed: Jun. 13, 1983

[51] Int. Cl.$^3$ ............................................. B65G 25/00
[52] U.S. Cl. ..................................... 198/409; 198/420; 198/653; 414/680; 414/736; 294/87.1
[58] Field of Search ............... 198/409, 486, 375, 488, 198/420, 419, 653, 694, 695, 696; 414/224, 226, 733, 736; 294/87 R, 113

[56] References Cited

U.S. PATENT DOCUMENTS

| 2,623,648 | 12/1952 | Rowe | 414/733 |
|---|---|---|---|
| 2,948,417 | 8/1960 | Haanes | 414/733 |
| 3,232,446 | 2/1966 | Spurr et al. | 414/733 |
| 3,347,587 | 10/1967 | Frost | 294/87.1 |
| 3,587,888 | 6/1971 | Warren | 198/486 X |
| 4,065,001 | 12/1977 | Ohnaka | 414/733 |

FOREIGN PATENT DOCUMENTS 1088184 10/1967 United Kingdom ................ 198/409

Primary Examiner—Joseph E. Valenza
Assistant Examiner—Michael Stone
Attorney, Agent, or Firm—Learman & McCulloch

[57] ABSTRACT

Stacks of generally dish-shaped, nested plastic articles are gripped and transferred from elevated, horizontally adjacent chutes comprising circumferentially disposed, axially extending supports, which are open at both ends to permit articles to be both fed thereto and removed axially therefrom, to a conveyor disposed at a lower level. A transfer arm, mounting stack gripping receivers, which pivot on the transfer arm, is swung in an arcuate path and the receivers are moved relative to the transfer arm, responsive to swinging movement of the transfer arm, such that the receivers travel from a first position, horizontally axially aligned with said chutes and axially intermeshed with the supports, in a path having a first axially linear increment, then a downward arc to rotate said stacks substantially 90°, and finally a vertically linear path to deposit the stacks on the conveyor. The receivers are radially contracted to peripherally grip stacks of articles in the chutes when the receivers are in the first position, and are radially expanded to peripherally release the stacks when the receivers have moved the stacks to the conveyor.

15 Claims, 7 Drawing Figures

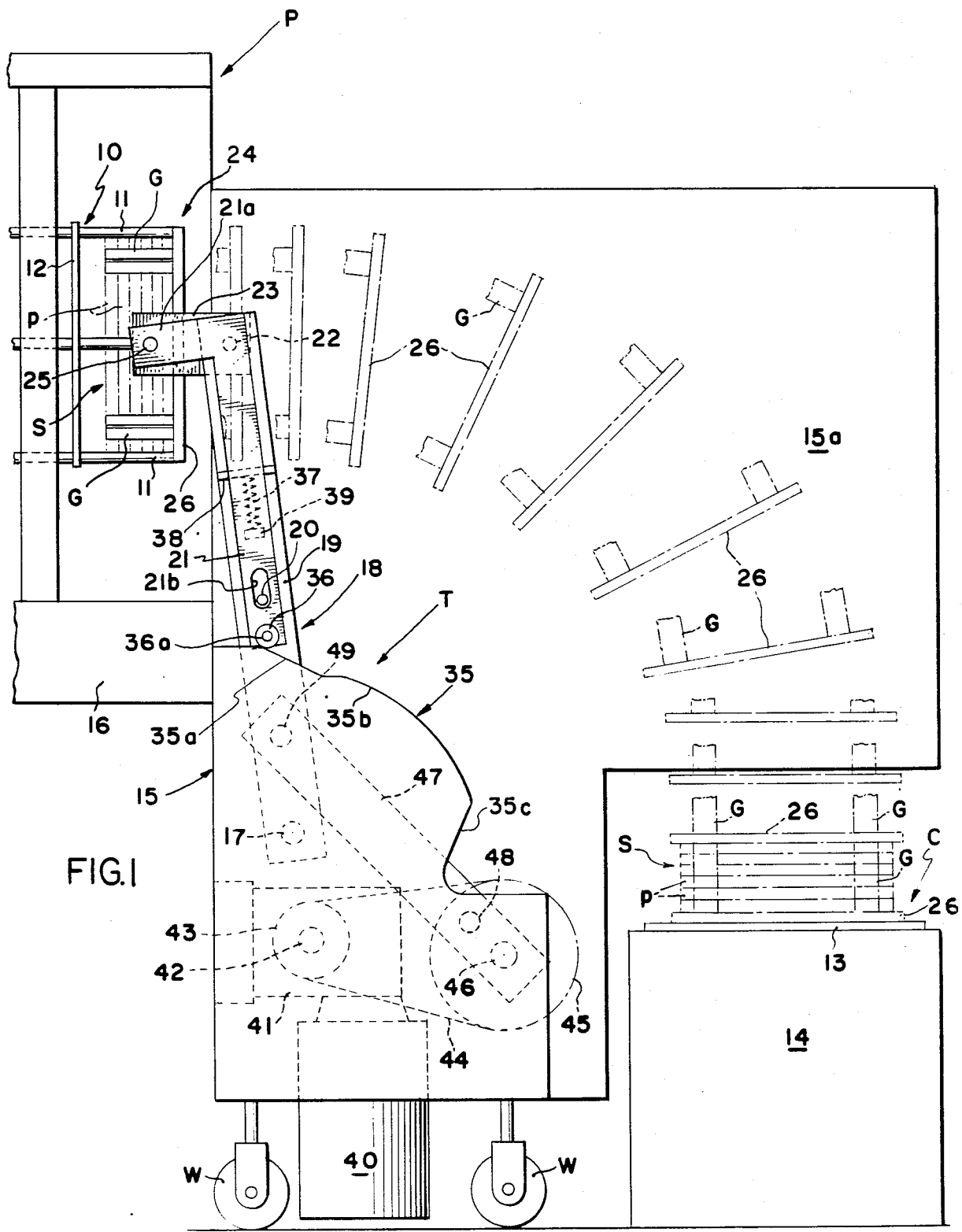
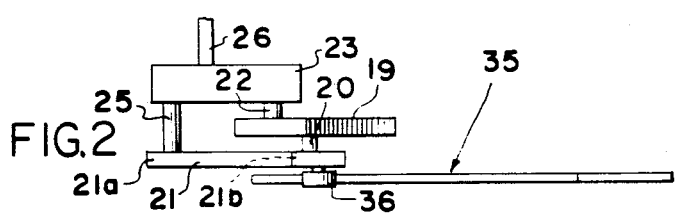
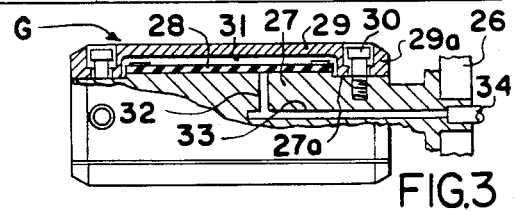

4,502,588

APPARATUS AND METHODS FOR TRANSFERRING NESTED STACKS OF PLASTIC ARTICLES FROM AN ELEVATED CHUTE TO AN UNDERLYING CONVEYOR SURFACE

BACKGROUND OF THE INVENTION

Various prior art devices have been suggested for transferring articles in an arcuate path and I refer particularly to U.S. Pat. Nos. 3,080,070; 3,593,493; 3,777,906; 4,134,318; and 4,216,689 in which individual articles are handled. The particular problem faced by the present inventors involves the transfer of stacks of plastic articles which are somewhat fragile and flexible from the chutes of a trim press to an underlying conveyor which may be proceeding in a direction at right angles to the axis of the chutes. An apparatus for accomplishing this is shown in the present assignee's U.S. Pat. No. 3,491,633, in an environment in which nested plastic cups are being separated. In the present assignee's U.S. Pat. No. 3,217,576, relatively small diameter lids are being trimmed or separated from the web in the trimming machine.

The present invention is concerned with handling even more difficult to handle stacks of plastic articles of disc-like configuration such as plastic plates, and moving them from the trim press chutes to an underlying conveyor which is, in contrast to the discharge conveyor shown in U.S. Pat. No. 3,491,633, located at a considerably lower level than the trim press chutes.

The apparatus involved in the present invention is, preferably of a portable nature in the sense that it comprises a frame mounted on wheels which permits it to be moved to various locations. It, further, is of the type which utilizes a swingable transfer arm. When handling articles such as stacks of shallowly nested, relatively thin-walled, plastic plates, we have found it expedient, to avoid a multitude of problems, to employ radially contractable and expansible stackgripping members, and to provide such members on a receiver head mounted on the transfer arm assembly for moving the stacks of articles simultaneously in a downward path.

In accordance with the present invention, the receiver or gripping head must travel from a first position axially aligned with the chutes in which the stack gripping members are axially intermeshed therewith in a path having a first horizontally linear increment, then a downward arc, and finally a terminal vertically linear path which deposits the stacks of articles on the conveyor surface. The horizontally axially linear path is necessary to remove the stacks of articles from the stack support chutes which are mounted on the trimming machine and extend axially outwardly from the trimming die, and the vertically linear path is necessary to deposit the stacks on the underlying conveyor, and then withdraw without disturbing the lateral orientation of individual plates in the stack which do not nest deeply and can be easily displaced. The return path is identically in reverse. It is when the grippers on the receiving or transfer head are intermeshed with the members forming the chutes of the trimming machine, that the grippers are operated to assume a radially contracted position, and it is when the stacks are deposited on the take-away conveyor that the gripper members are operated to assume an expanded position which results in the release of the stacks to the take-away conveyor.

One of the prime objects of the invention is to design a transfer arm-receiver head assembly which can be driven in timed relation with the operation of a trim press in a continuous manner, such that when stacks of articles are available in the trim press chutes, the receiver head is in axially oriented relationship with the chutes with the grippers in position to radially contract and grip the stacks of plates.

A further object of the invention is to provide a relatively simple, economical, and yet reliable machine for accomplishing the transfer function.

Still a further object of the invention is to design a positively controlled unit in which the required path of movement of the stacks of articles is maintained.

SUMMARY OF THE INVENTION

Apparatus is provided for transferring generally horizontally disposed rows of stacked plastic dinner plates, or the like, of disc-like, dished configuration, which nest only shallowly, to a transversely extending underlying conveyor disposed at a considerable distance below the trim machine's stack chutes. As disclosed, the portable machinery employs perimetrally disposed grippers, defining tunnel-shaped articles receivers, which intermesh with the rods or the like forming the stack support chutes. The article receiver or transfer head is mounted for swinging movement on a transfer arm which, itself, is mounted for swinging movement on a portable frame. The stack grippers are caused to move to radially contracted position when the transfer head grippers are interleaved with the members defining the trim machine discharge chutes, and the grippers are actuated to a radially expanded condition when the transfer head has moved to deposit the stacks on the underlying conveyor.

The swinging movement of the transfer arm assembly, and the relative movement of the transfer head on the transfer arm, are controlled such that the grippers on the transfer head travel from a first position in which they axially envelop the stacks in a path having a first horizontally linear increment, then move through a downward arc, and finally move in a vertically linear path to deposit the stacks of articles on the conveyor surface. Both the vertically linear path and the horizontally linear increment of travel are followed in the return path of travel.

In a first embodiment of the invention, the stacks are removed and deposited on the conveyor with the ends of the stacks which were outermost in the trim press chutes being deposited on the discharge conveyor. In the other embodiment which is disclosed, the stacks are inverted as they travel, and it is the innermost ends of the stacks in the trim press chutes which are deposited on the discharge conveyor.

Other objects and advantages of the invention will become apparent by reference to the following specification, and to the drawings.

IN THE DRAWINGS

FIG. 1 is a side elevational view of the embodiment which deposits the outermost end plate of each stack in the chutes on the surface of the transfer conveyor below, with the components of the mechanism being shown in raised stack receiving position, the chain lines indicating the progressive positions of the ring supports for the plate gripping members during the path of travel away from, and back to, the trim press chutes, and depicting a previously deposited stack in deposited position on the discharge conveyor;

FIG. 2 is a fragmentary top plan view, illustrating the manner in which the transfer head is supported on the transfer arm assembly;

FIG. 3 is an enlarged, partly sectional view illustrating the radially contractable and expansible stack gripping members which are employed;

GENERAL DESCRIPTION

Figure 4:
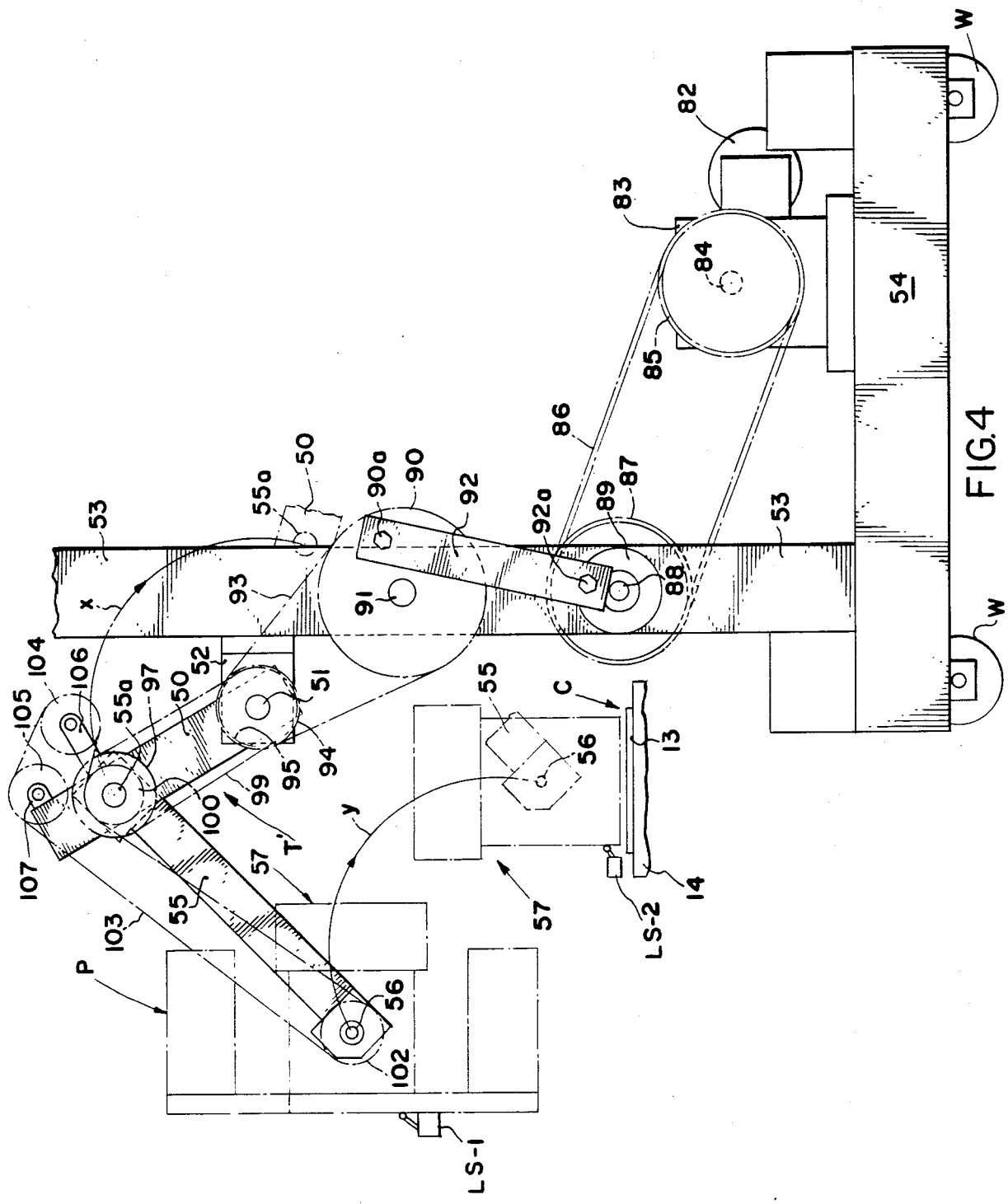
FIG. 4 is a side elevational view of a partly schematic nature illustrating a second embodiment in which the stacks of plates are inverted in moving to the discharge conveyor, the mechanism being shown in raised stack receiving position, but the chain lines indicating the extreme positions of the transfer head and certain portions of the transfer arm components.

In FIGS. 1 and 4, respectively, transfer machine, or unit, generally respectively designated T an T' is shown mounted on wheels W, so as to be positionable between a trim press, generally designated P, and a discharge conveyor, generally designated C. The aforementioned U.S. Pat. Nos. 3,491,633 and 3,217,576, which are incorporated herein by reference, disclose trim presses which have a plurality of horizontally parallel, discharge chutes into which the articles which have been severed from the plastic web are successively pushed as an adjunct of the severing operation. As disclosed in FIGS. 1, 5 and 7, a plurality of chutes, generally designated 10, in side-by-side relationship, as disclosed in U.S. Pat. No. 3,491,663, are typically provided on the output side of a plastic article trim press. Each of the side-by-side chutes 10 is formed by a plurality of horizontally, or axially, extending rods 11 which are disposed in circumferentially spaced position and may be connected by suitable exterior support rings 12 disposed in axially spaced relation. The chutes 10 are open at their inner ends to receive plates p as they are punched from the intermittently fed, vertically indexed web of plastic in the manner disclosed in U.S. Pat. No. 3,491,633, and they are also open at their outer ends so that stacks S of the plates or other articles may be removed therefrom.

The discharge conveyor C is shown in both FIGS. 1 and 4 as an endless belt 13 proceeding transversely relative to the direction of extent of rods 11. Conveyor C is preferably an intermittently operated conveyor which has a dwell period in which the endless belt 13 does not travel on the conveyor frame 14, during the time that stacks of plates or the like are being deposited on the belt 13, and the transfer head is initially withdrawing from the stack.

THE EMBODIMENT DISCLOSED IN FIGS. 1–3

The transfer unit disclosed in FIGS. 1–3, includes a frame 15 which can be moved into abutting relation with the frame elements 16 of the trim press P, as shown. Pivotally supported at 17, between the frame side plates 15a, is a transfer arm assembly generally designated 18, which includes an arm 19 at each side of the machine, connected by a pin 20 with an arm 21 which is L-shaped in configuration in the sense that it has an upper, forwardly projecting portion 21a. Each arm 21 is provided with a slot 21b within which the pin 20 projecting from arm 19 is received, so that arm 21 can have a limited telescopic movement with respect to arm 19.

Pivotally secured to the transfer arm 19 at 22 at each side of the machine is a block 23 which functions as one component of a receiver or gripper head, generally designated 24. At its opposite end, block 23 is pivotally connected by a pin 25 to the inner end of arm portion 21a. Blocks 23 fixedly support the rings 26 to which article grippers, generally designated G, are affixed and from which they axially protrude in circumferentially spaced relationship, such as to be capable of interleaving or intermeshing with the guide rods 11 forming each chute 10.

While FIG. 1 shows only a single ring 26, it is to be understood that, in the typical installation, a series of four or more cylindrical chutes 10 would be provided in horizontally aligned abutment and there is a ring 26 for each chute. The mechanism disclosed in FIG. 2 would be typically also provided for the opposite side of the device.

Each gripper unit G, as disclosed in FIG. 3, may comprise a core 27 surrounded by expansible cylinder or bladder 28 of rubber or another elastic material. Reduced diameter portions are provided on opposite ends of core 27 at 27a to accommodate the lugs 29a, which project from the circumferentially abutting plates 29. Plates 29 are capable of limited radial float on the bolts 30, with expansion of the bladder 28 radially into the space 31. Ports 32, provided at circumferentially spaced intervals in core 27, connect with an axial port 33 and a flexible line 34 leading to a valve and compressed air supply which is operable to either furnish air under pressure to expand bladder 28, or to permit air in port 33 to bleed to atmosphere to permit bladder 28 to return to the position in which it is shown in FIG. 3.

Of course, when it is desired to radially expand the positions of grippers G, air under pressure is fed to the flexible line 34 for each gripper G, and expansion of bladder 28 forces the plates 29 outwardly to a position in which they collectively peripherally grip the plates in the stacks S. When it is desired to release the plates p in the stacks S, at a time when ring supports 26 are resting on belt conveyor 13, air is permitted to bleed from the passages 33 and the grippers G and plates 29 return to radially contracted position, thus operating to provide radially expanded receiver tunnels in which the peripheral surfaces of grippers G no longer engage the plates of the stacks.

As FIG. 1 indicates, because stacks of plates p are involved, rather than single articles, we have discovered that a different path of travel must be followed than is normal with transfer arms which pivot in substantially 90° arcs. To generate the path of travel which has been described for the support ring 26 and its grippers G, fixed cam track surfaces, generally designated 35, are provided on frame 15 at each side of the machine, and a follower roller 36, revolvably supported on pin 36a on each arm 21, is maintained in engagement with the appropriate cam surface 35 by a spring 37, connected between a support 38 on arm 19, and a support 39 which underlies it and projects laterally from arm 21.

As noted earlier, it is the slot 21b which permits relative movement of each arm 21 relative to arm 19, and permits the follower rollers 36 to follow the configuration of cam 35. Arm 19 is driven through substantially a slightly more than 90° arc, and then returned, by a continuously driven motor 40, operating through a gear box 41, both of which are supported by frame 15.

An output shaft 42, on gear box 41, may drive a sprocket 43 around which a chain 44 is trained, such that sprockets 45, mounted on a shaft 46 journaled by frame 15, is driven. A connecting rod 47, connected with each sprocket 45 at 48, drives the arms 19 in their path of travel via the pivotal connections 49 to the arms 19.

THE OPERATION

Initially as follower rollers 36 move along the initial portions 35a of cam surfaces 35, the springs 73 will move the arms 21 downwardly with respect to the arms 19, which will have the effect of moving the outer end of support blocks 23 downwardly with respect to pivots 25. Each support block 23 and ring 26, accordingly, instead of following the arcuate path dictated by the pivoting of arms 19 about pivot shaft 17, proceeds linearly horizontally until the stacks S of plates p clear the guide rods 11. Once the follower rollers 36 reach cam surfaces 35b, which are concentric with pivots 17, the arms 21 are moved upwardly with respect to arms 19, and rings 26 follow the arcuate path of arms 19 about pivots 17.

When follower rollers 36 reach the portions 35c of cams 35, arms 21 are released and again urged downwardly with respect to arms 19 by springs 37, and blocks 23 are tilted once again about pivots 25, so that rings 26 follow the vertically linear path depicted in FIG. 1, as they deposited the stacks S on the conveyor 13. Rings 26 similarly follow this path in their return as rollers 36 guide along surfaces 35c, and do not, in that return, follow an initially arcuate path which would laterally engage and displace the plates p with respect to one another. Once cam surfaces 35b are encountered by the rollers 36, on the return travel of transfer arm T, an arcuate path is followed by rings 26. Finally, when surfaces 35a are encountered, tilting of the blocks 23 about pivots 35, at opposite sides of the horizontally disposed chutes, causes the ring 26 to follow the horizontally linear path which axially interleaves them with the rods 11 of the chutes and leaves them in enveloping relation with the next stacks S of plates p to be removed. It is, of course, only when the grippers G are in inwardmost position that they are radially expanded to grip the next stacks to be transferred.

THE SECOND EMBODIMENT

FIGS. 4–7 disclose a transfer arm assembly T' made up first arm components 50 at each side of the machine, pivotally mounted for swinging movement on pivot shafts 51 which are carried on brackets 52, supported by the upright frame portions or columns 53 which extend upwardly from the machine base 54. The second arm components 55 are pivotally supported on the outer ends of arms 50, as by a shaft 55a carried by arms 50, and the arm components 55 carry shafts 56 on which the gripping and transfer head, generally designated 57 (which is more particularly illustrated in FIGS. 5–7) is pivotally mounted.

Figure 6:
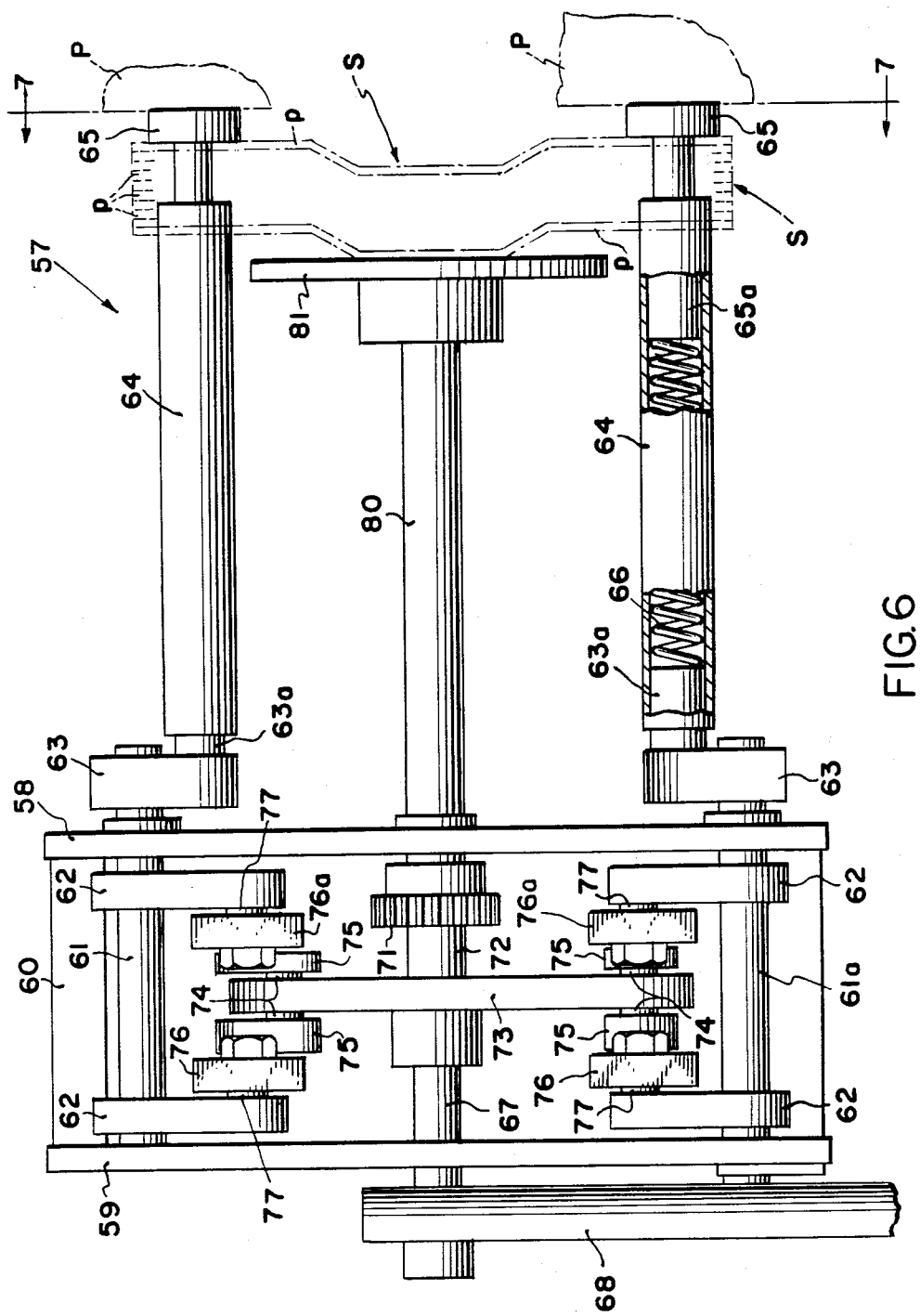
FIG. 6 is a still more enlarged, side elevational view of the transfer head.
Figure 7:
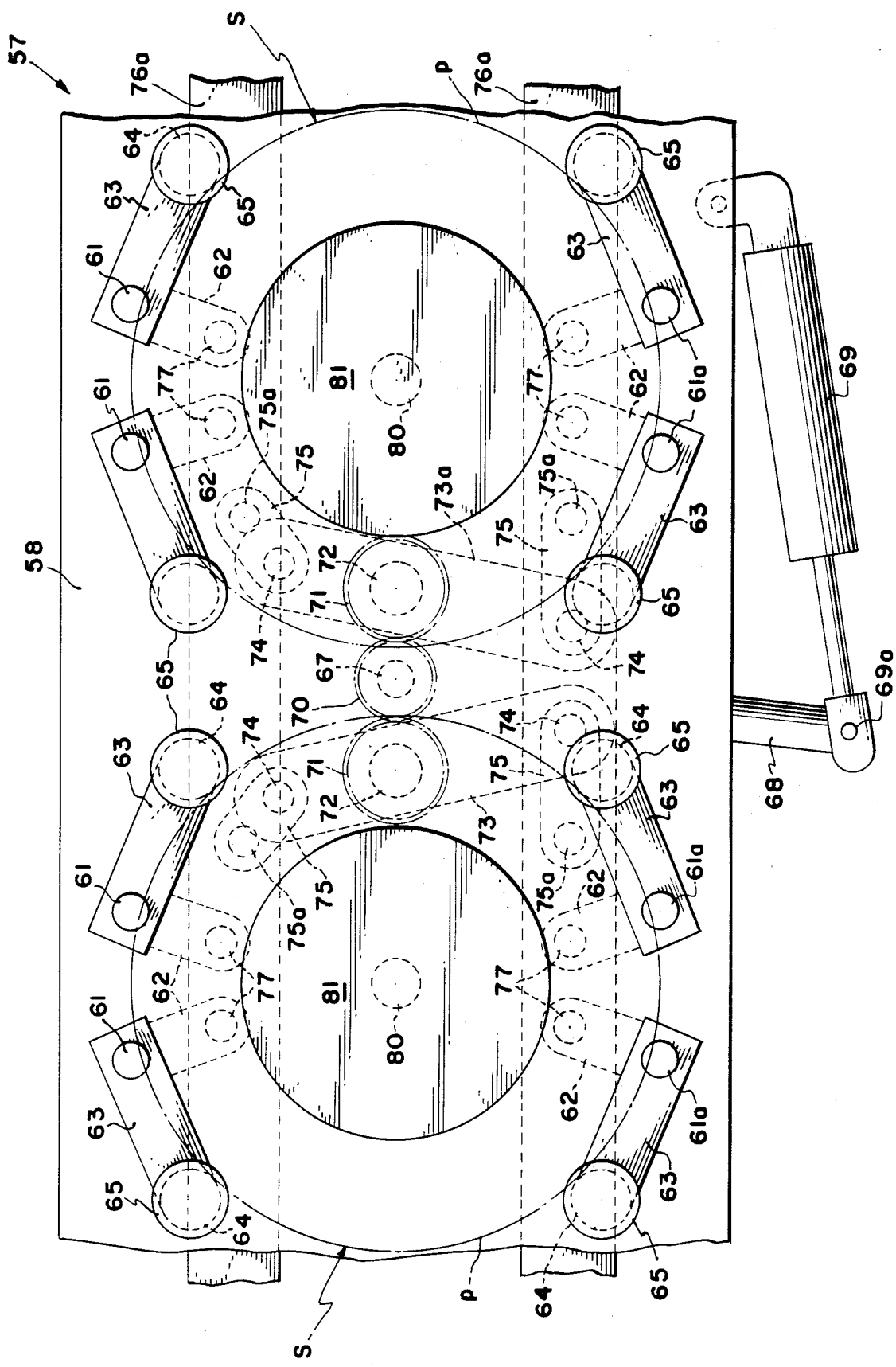
FIG. 7 is a front elevational view thereof, the view being taken on the line 7—7 of FIG. 6.

As FIGS. 6 and 7 particularly disclose, the gripper head 57 includes inner and outer support plates 58 and 59, connected by suitably circumferentially spaced braces 60. Extending between the plates 58 and 59, and projecting outwardly beyond plate 59, are pairs of upper and lower pivot shafts 61 and 61a. Fixed on the outer ends of the pivotal shafts 61 and 61a, to form bell cranks, are links 63 with projections 63a which journal forwardly projecting elongate roller sleeves 64. Also, between plates 58 and 59, links 62, fixed to shafts 61 and 61a pivotally connect the shafts 61 and 61a and therefore links 63 to actuator bars 76 and 76a.

As FIG. 6 indicates, received in the ends of sleeves 64 are the shaft projections 65a of outer rollers or members 65, which are urged outwardly to the positions shown by springs 66 in which they always engage the press P even though the press P is vibrating. The radial position of the rollers 64 and 65 is changed when shafts 61 and 61a are rocked by bars 76 and 76a and the collective position of the rollers is contracted to grip a stack S in the manner indicated in FIG. 6 such that the outermost plate p is laterally engaged by rollers 65. This actuation occurs when a rock shaft 67 is partially rotated via a rod 68 fixed thereto, which has the piston rod of a double acting, solenoid operated, air cylinder 69, mounted on plate 59, connected thereto as at 69a. As indicated, this occurs in opposite directions at opposite ends of the arm T'.

The rocking movement of shaft 67 is transmitted via a spur gear 70 (FIG. 7) fixed on the shaft 67 to spur gears 71 on shafts 72 (to rock them oppositely) and thereby to links 73 and 73a, fixed to the shafts 72. At its upper and lower ends link 73 connects via pins 74 and links 75 (and pins 75a) to the elongate actuator bars 76 which extend substantially the length of the transfer head and operate to move the rollers 64 connected to shafts 61 for all the chutes in synchronism. Similarly, at its upper and lower ends link 73a connects via pins 74, links 75 and pins 75a to the elongate actuator bars 76a which extend substantially the length of the transfer head and operate to move the rollers 64 connected to shafts 61a for all the chutes in synchronism. The links 62 are pivotally connected to the actuator bars 76 and 76a by pins 77. Accordingly, when shaft 67 is rocked in either direction by virtue of the operation of air cylinder 69, the movement is translated via gear 71 to the links 73 and 73a, fixed to the gear shafts 72, which transmit motion in opposite directions via the elongate actuator bars 76 and 76a.

Provided, with respect to each set of rollers 64 for each chute, concentric with the set of rollers 64, in each instance, is a shaft 80 fixed to the plate 59, and mounting a stripper disc 81 on the end thereof.

THE TRANSFER HEAD DRIVE MECHANISM

Figure 5:
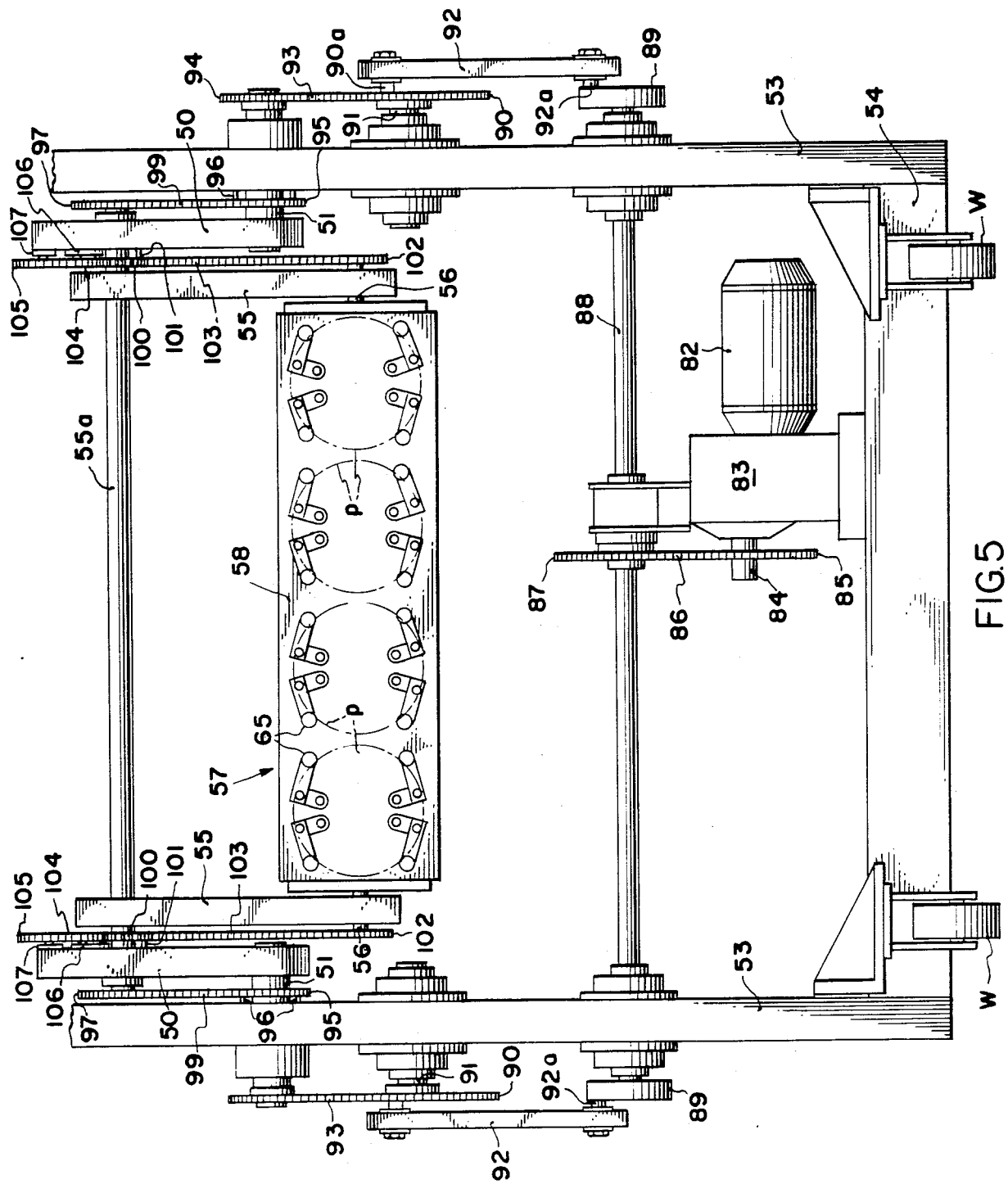
FIG. 5 is an enlarged, front elevational view thereof, the chain lines depicting stacks of plastic plates as being gripped.

As FIGS. 4 and 5 particularly indicate, a motor 82 is provided to drive a gear box 83 supported on platform 54, gear box 83 having an output shaft 84, driving a sprocket 85. The sprocket 85, via a chain 86, drives a sprocket 87 provided on a jack shaft 88, supported by columns 53. A drive wheel 89 fixed to each end of shaft 88 is connected with a sprocket 90, fixed on a shaft 91, journaled on each side by a column 53, each sprocket 90 being driven by a connecting rod 92 pivoted to wheel 89 at 92a, and to the sprocket 90 at 90a.

Trained around each sprocket 90 is a chain 93, which is also trained around a sprocket 94 for driving shaft 51. Each shaft 51, as a result of the driving motion imparted by connecting rod 92 is driven in oscillating rocking movement which causes transfer arm component 50 to travel in the arc x about fixed pivots 51, the arc x describing the pivoting movement of the shaft 55a (the lower position of the transfer arm T' being shown in chain lines in FIG. 4). While the transfer arm component 50 is traveling in the arc x, the shafts 56 on which the transfer head 57 is pivotally mounted, are traveling in the arc y. The transfer head 57 is also inverting about pivots 56, as indicated by the chain lines in FIG. 4. It is necessary, as previously described, that the transfer head 57 travel in a horizontally linear path in the same manner as previously, and also in a vertically linear path in the same manner as previously, at the ends of its path of movement.

To achieve inversion, a sprocket 95 (FIG. 5), journaled on each shaft 51, is fixed to frame members 53 as with pins 96, and is connected with sprockets 97 fixed on the ends of shaft 55a by a chain 99.

Further sprockets 100, fixed to component arms 50 by pins 101, are connected to sprockets 102 by chains 103, sprockets 102 being fixed to shafts 56 on which transfer head 57 is also fixed. The chain path is around sprockets 104 and 105 journaled in bearings 106 and 107 extending from and supported by arms 55.

In this way, the movement of sprockets 97 create an increment of pivotal movement of shaft 55a to which arms 55 affix to provide inverting movement. Further, the movement of chains 103 is transmitted to the transfer head pivot shafts 56, and this motion is such as to pivot the transfer head 57 relative to transfer component arms 55 to maintain the previously mentioned linearity of horizontal and vertical travel, even though arms 50 are traveling in an arcuate path.

THE OPERATION OF THE SECOND EMBODIMENT

In operation, the path followed by the transfer head 57 in the second embodiment T', is the same as previously in the sense that the horizontal linear path and the vertical linear path increments of travel are maintained in the manner indicated. Relative travel of the arm components 55 relative to the arm components 50, however, causes an inversion of the transfer head 57 once the rollers 65 clear the trim press chutes, and the stack S of plates p or the like is then inverted when it is deposited on the belt conveyor C.

When the rollers 64 are first moved into surrounding relationship with the stacks S cylinder 69 is operated by a limit switch LS-1 in a direction to cause links 73 and 73a to move actuating bars 76 and 76a at the top and bottom on the transfer head (FIG. 7) in such directions rollers 64 move radially inwardly to grip the periphery of the stack S of plates p. Once the stack of plates is deposited on the belt 13, cylinder 69 is operated by limit switch LS-2 which causes rock shaft 67 to rock in the opposite direction. This has the result of operating the links 73 and 73a to cause actuating bars 76 and 76a to move in the reverse directions such that crank links 62 accordingly are swung reversely and rollers 64 and 65 move radially in a direction away from the periphery of the plates p to clear them radially. Stated in another way, the rollers 64 are moved to an expanded position. When the transfer head T' is then later moved upwardly in a linear path, stripper 81 assures that the stack S will not move upwardly with the rollers 64 or 65.

This disclosure is representative of the presently preferred forms of the invention, but is intended to be illustrative rather than definitive thereof. The invention is defined in the claims.

We claim:

1. Apparatus for transferring generally horizontally disposed rows of stacked plastic articles of disc-like configuration and the like comprising:
   a. generally horizontally extending, axially elongate stack support chutes open at the ends thereof to receive and support a nested stack of said articles;
   b. stack gripping means comprising axially extending circumferentially spaced members surrounding and defining a tunnel-shaped article receiver;
   c. means operating the circumferentially spaced members to cause relative radial contraction, and then expansion, of the receiver;
   d. an underlying conveyor surface disposed at a level below said chute;
   e. a frame;
   f. a transfer arm mounted for swinging movement on said frame and supporting said receiver for movement with the transfer arm, and for relative movement therewith;
   g. means for swinging said transfer arm and for moving the receiver relatively thereto, to cause the receiver to travel from a first position horizontally axially aligned with said chute and axially intermeshed therewith in a path having a first horizontally linear increment, then a downward arc, and terminating in a vertically linear path which deposits a stack of articles on said conveyor surface;
   h. said means operating the circumferentially spaced members causing radial construction of the receiver when the receiver is in said first position, and expansion when the receiver has moved in said vertically linear path; and
   i. motor means for swinging said transfer arm.

2. The apparatus of claim 1 wherein said transfer arm is pivotally mounted on said frame, and cam means controls movement of said receiver relative to said transfer arm.

3. The apparatus of claim 2 wherein said cam means comprises a fixed cam track on said frame, and said receiver mounts follower means in engagement with said track.

4. The apparatus of claim 3 wherein said receiver includes a second arm telescopically connected with said transfer arm, and a receiver head carrying said members is pivotally mounted on said second arm, said second arm mounting the follower means; and means interacting between said head and second arm for controlling pivoting movement of the head relative to the second arm, dependent on the movement of the second arm in response to the follower means.

5. The apparatus of claim 1 wherein said members are inflatable and deflatable; and said means operating them comprises a fluid pressure supplying and egressing system.

6. The apparatus of claim 1 wherein said receiver includes a head; and means mounts said members on the receiver head for movement from a radially expanded position to a radially contracted position.

7. The apparatus of claim 6 wherein said means mounting the members comprises individual bell cranks pivotally mounted on said head for pivotal movement from a radially outer position to a radially inner position; reciprocable bar means on said head connecting certain of said bell cranks; and control means for moving said bar means to move the bell cranks to radially inner contracted positions and radially outer expanded positions.

8. The apparatus of claim 7 wherein said control means includes a rock shaft and oppositely moving links on opposite sides thereof connecting said rock shaft and bar means.

9. The apparatus of claim 1 wherein said transfer arm is pivotally mounted on said frame; motor means drives said transfer arm to pivot in an arc and to return; and means interacts between said receiver and arm responsive to movement of said transfer arm to move the receiver relative to the transfer arm to cause the receiver to adhere to said path.

10. The apparatus of claim 1 wherein said transfer arm mounts on a frame carried first shaft, and comprises a pair of first and second support arms pivotally connected by a second shaft such that the second support arm is fixed to the second shaft and extends from the first support arm, the receiver includes a head, for supporting said article gripping members, fixed on third shaft means on the free end of said second support arm; the first support arm being mounted on said frame to swing thereon; a first sprocket fixed to the frame, a second sprocket fixed to said second shaft and chain-connected with said first sprocket to cause rotation of the second shaft to invert the head, and a third sprocket fixed on said third shaft means and chain-connected with said second shaft, such that movement of the second sprocket with said second support arm support causes rotation of the third sprocket and third shaft means which is imparted to the third shaft means and receiver head.

11. The apparatus of claim 10 wherein said frame is mounted by wheels and said motor means is carried on said frame and comprises a continuously driven rotary motor; and motion translation means for translating the rotary motion into oscillation of said transfer arm first support arm.

12. The apparatus of claim 11 wherein said motion translation means comprises a fourth sprocket driven by said motor and a fifth sprocket fixed on said first shaft, and a connecting rod pivotally affixed to and drivingly connecting said fourth and fifth sprockets.

13. A method of transferring a stack of generally disc-shaped nested articles from an elevated, horizontal chute comprising circumferentially disposed, axially extending supports, which are open at both ends to permit articles to be both fed thereto and removed axially therefrom, to a conveyor disposed at a lower level, comprising the steps of:
  a. swinging a transfer arm, mounting a stack gripping receiver which pivots on the transfer arm, in an arcuate path;
  b. moving the receiver relative to the transfer arm responsive to swinging movement of the transfer arm such that the receiver travels from a first position, horizontally axially aligned with said chute and axially intermeshed with the supports, in a path having a first axially linear increment, then a downward arc to rotate said stack substantially 90°, and finally a vertically linear path to said conveyor;
  c. radially contracting the receiver to peripherally grip a stack of articles in the chute when the receiver is in said first position; and
  d. radially expanding the receiver to peripherally release the stack when the receiver has moved the stack to the conveyor.

14. The method of claim 13 in which the receiver is returned in the same path in reverse.

15. Apparatus for transferring generally horizontally disposed rows of stacked plastic articles of disc-like configuration, and the like, comprising:
  a. generally horizontally extending, axially elongate stack support chutes open at the ends thereof to receive and support nested stacks of said articles;
  b. a wheel mounted frame;
  c. stack gripping means supported by said frame comprising a head with sets of axially parallel circumferentially spaced roller members thereon surrounding and defining laterally adjacent shaped article receivers, the roller members being mounted on individual bell cranks pivoted on said head to move from a collectively circumferentially compressed position to a circumferentially expanded position, and return;
  d. link means carried by said head connecting said bell cranks and operating the bell cranks to cause said roller members to be pivoted to said radially contracted position, and back to a radially expanded position;
  e. an underlying conveyor surface disposed at a level below said chutes;
  f. a transfer arm mounted for swinging movement on said frame and supporting said receiver head on a free end thereof for movement with the transfer arm and relative movement therewith;
  g. means for swinging said transfer arm and for moving the receiver head relatively thereto, to cause the receiver head and roller members to travel from a first position horizontally axially aligned with said chute and axially intermeshed therewith in a path having a first horizontally linear increment, then a downward arc, and terminating in a vertically linear path which deposits a stack of articles on said conveyor surface, said transfer arm comprising a pair of pivotally connected arm portions, one extending from the other and mounting the receiver head thereon;
  h. motor means for swinging said transfer arm;
  i. means interacting between said frame and arm portions for pivoting one arm portion relative to the other and between said arm portions for pivoting the receiver head on the second arm portion; and
  j. means operating the link means to cause radial contraction of the rollers when the receiver head is in said first position and radial expansion thereof when the receiver head has moved in said vertically linear path.

* * * * *

UNITED STATES PATENT AND TRADEMARK OFFICE
CERTIFICATE OF CORRECTION

PATENT NO. : 4,502,588
DATED : March 5, 1985
INVENTOR(S) : Robert C. Whiteside et al It is certified that error appears in the above-identified patent and that said Letters Patent are hereby corrected as shown below:

Column 2, line 22, change "articles" to -- article --.

Column 3, line 24, change "an" to -- and --.

Column 5, line 14, change "73" to -- 37 --.

Column 5, line 41, change "ring" to -- rings --.

column 5, line 52, after "up" insert -- of --.

Column 7, line 45, change "on" to -- of --.

Column 8, line 26, change "construction" to -- contraction --.

Signed and Sealed this

Ninth Day of July 1985

[SEAL]

Attest:

DONALD J. QUIGG

Attesting Officer    Acting Commissioner of Patents and Trademarks